United States Patent
Goodspeed

(10) Patent No.: US 9,363,134 B1
(45) Date of Patent: Jun. 7, 2016

(54) LIGHTWEIGHT BROWSER MONITORING AND VIEWING

(75) Inventor: Joshua M. Goodspeed, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1022 days.

(21) Appl. No.: 12/210,128

(22) Filed: Sep. 12, 2008

(51) Int. Cl.
  G06F 15/173 (2006.01)
  H04L 29/08 (2006.01)
  H04L 12/26 (2006.01)
  H04L 29/06 (2006.01)
  G06Q 10/10 (2012.01)

(52) U.S. Cl.
  CPC .......... *H04L 29/08072* (2013.01); *H04L 29/06* (2013.01); *H04L 43/00* (2013.01); *G06Q 10/10* (2013.01)

(58) Field of Classification Search
  USPC ........................................................ 709/224
  See application file for complete search history.

(56) References Cited

U.S. PATENT DOCUMENTS

| | | | |
|---|---|---|---|
| 2002/0015042 A1* | 2/2002 | Robotham et al. | 345/581 |
| 2003/0168259 A1* | 9/2003 | Miller et al. | 177/25.15 |
| 2005/0138122 A1* | 6/2005 | Boehringer et al. | 709/205 |
| 2006/0080664 A1* | 4/2006 | Jawahar et al. | 718/100 |
| 2007/0157077 A1* | 7/2007 | Gibson et al. | 715/513 |
| 2007/0250618 A1* | 10/2007 | Hammond | 709/224 |
| 2008/0228899 A1* | 9/2008 | Plamondon | 709/219 |
| 2008/0276183 A1 | 11/2008 | Siegrist et al. | |

* cited by examiner

Primary Examiner — Kyung H Shin
(74) Attorney, Agent, or Firm — Kilpatrick Townsend & Stockton LLP

(57) ABSTRACT

Troubleshooting, training, and other services that can be provided remotely to a user of an application, Web page, or similar component can take advantage of a lightweight approach to monitoring, viewing, and/or control. A page being viewed by a user can have client executable code contained therein, wherein actions of the user with respect to the page can generate events that can be sent to a remote queue, service, server, etc. A local copy of the page can be created that can be viewed and/or operated by a person providing the service to the user. A listener component can be configured to retrieve events from the queue, etc., and send those events to the local device such that the local copy can be updated, causing the local copy to accurately reflect what the user is seeing and doing with respect to the page.

24 Claims, 9 Drawing Sheets

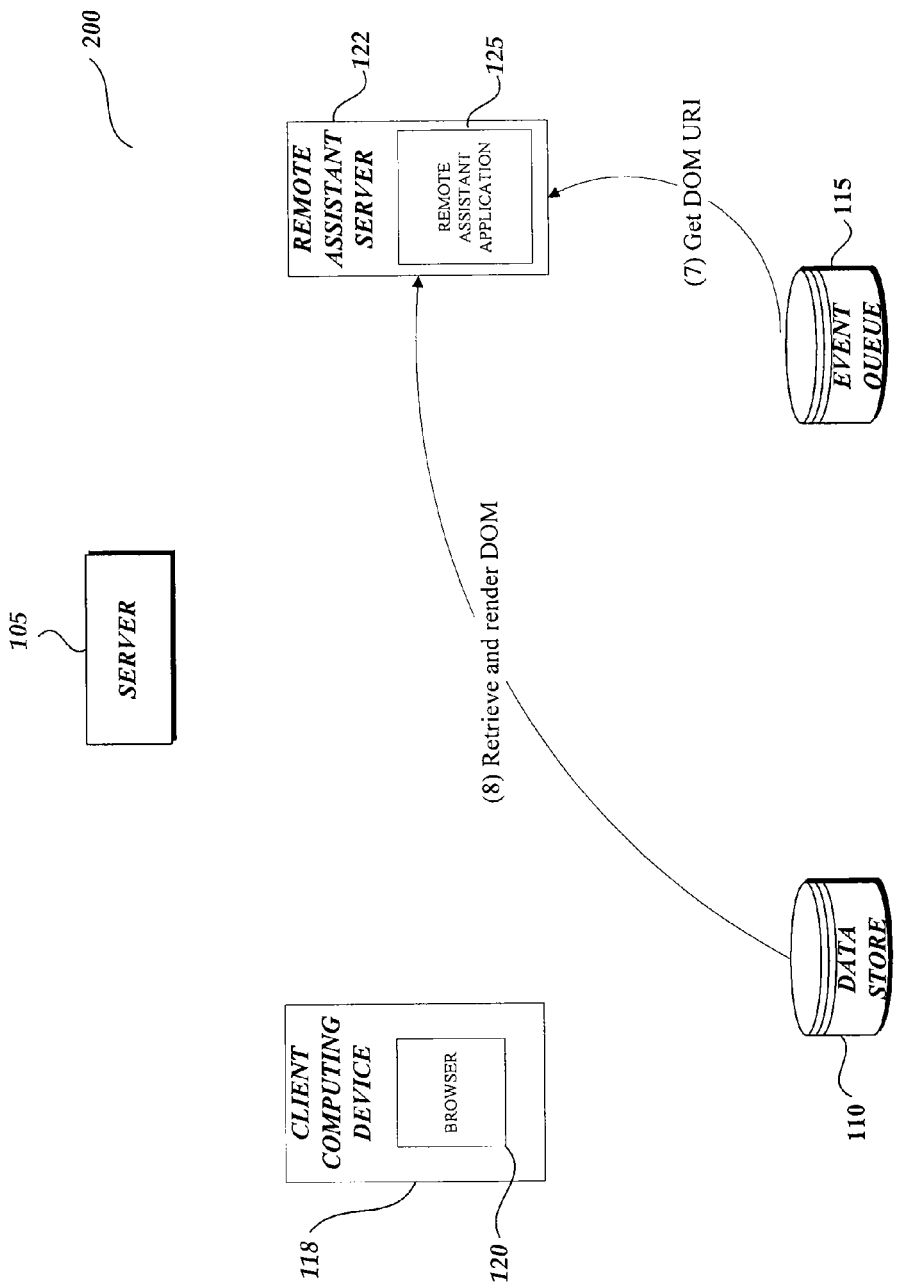

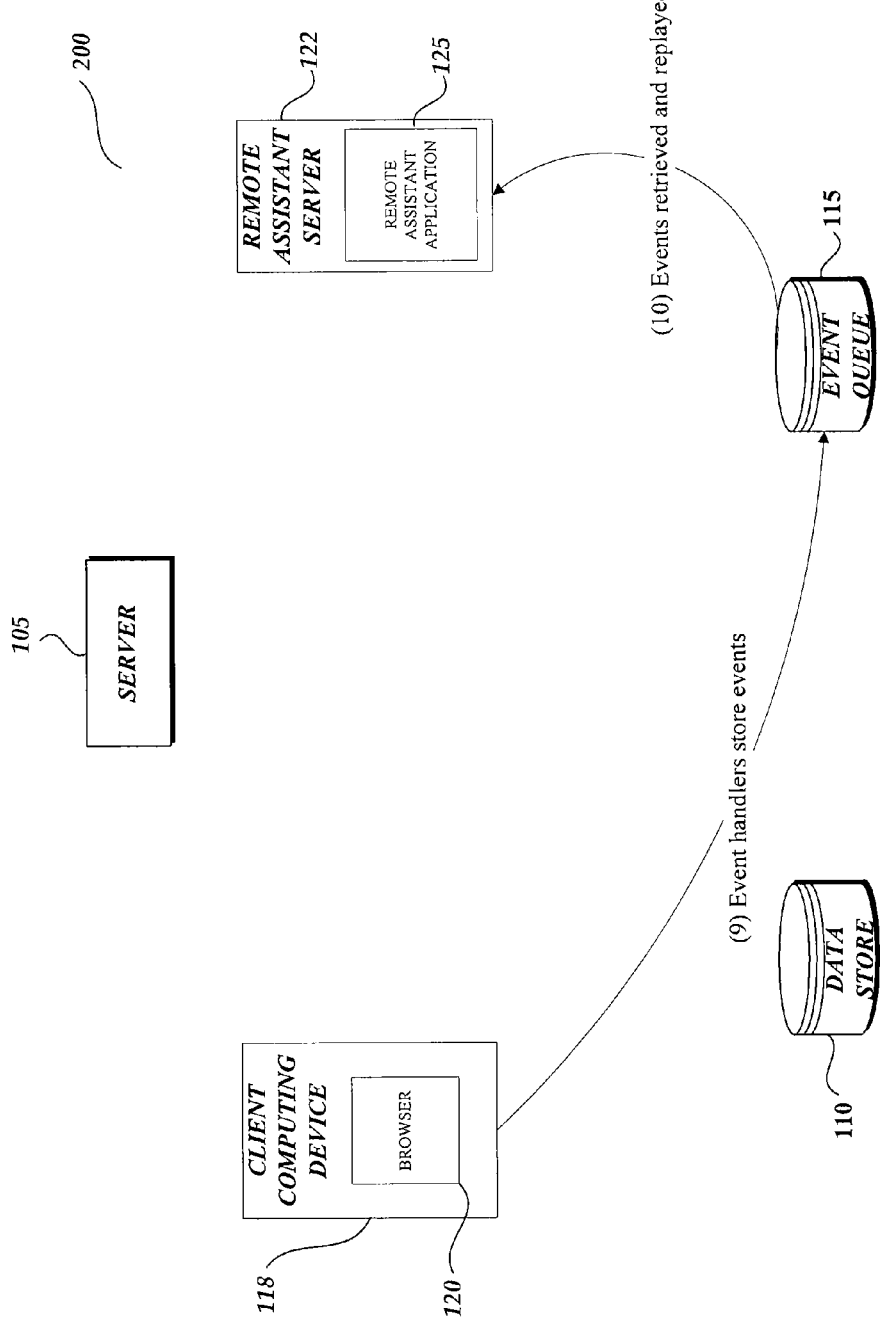

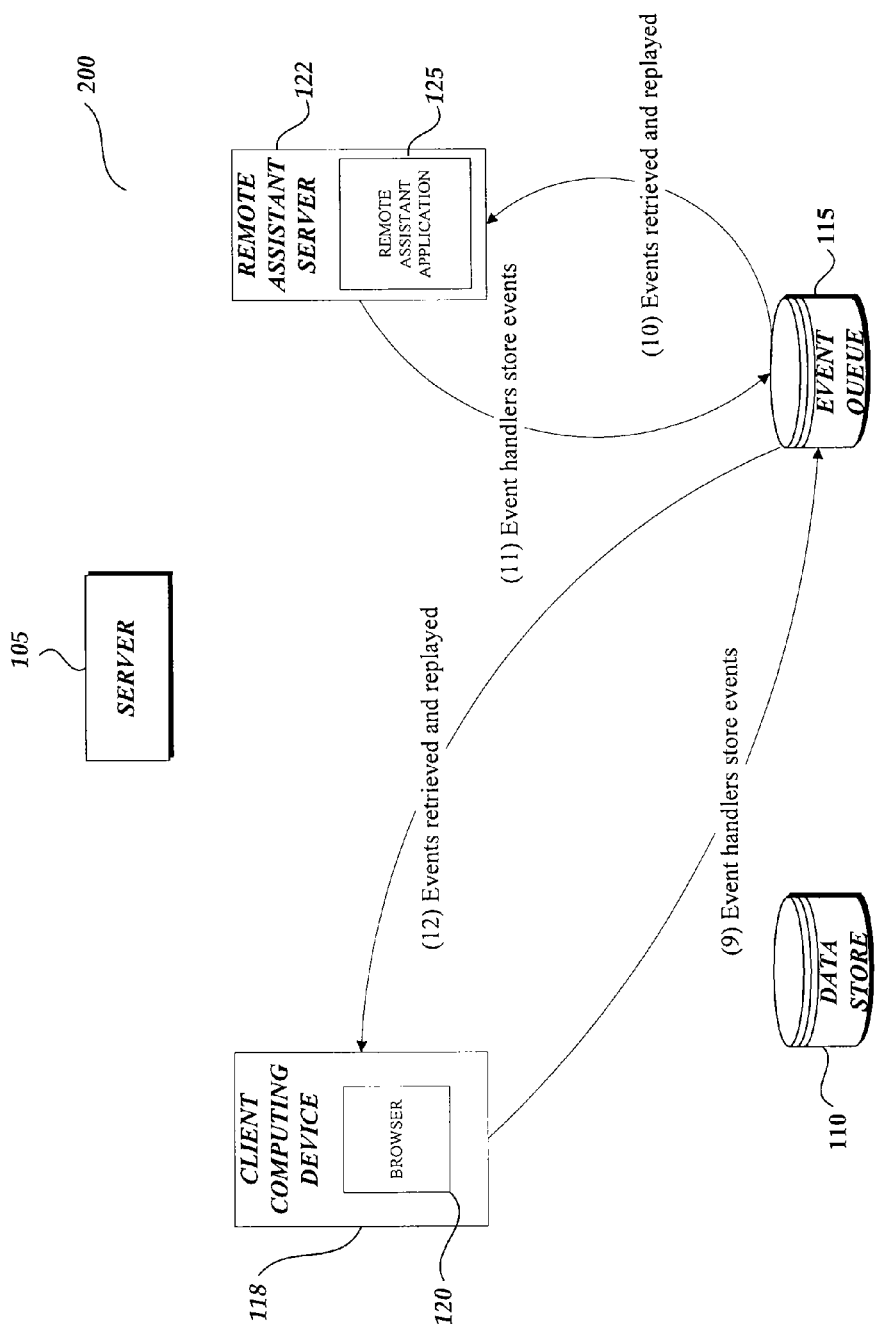

LIGHTWEIGHT BROWSER MONITORING AND VIEWING

BACKGROUND

As the popularity of the Internet and other computer use increases, situations often arise where a customer or computer user needs assistance completing any of a number of complex tasks on their computer. For example, Web pages or application user interfaces can sometimes be difficult for users to navigate. In some cases, the page or interface may appear to be malfunctioning. In these and other situations, it is often useful for a technical support person or other remote assistant, for example, to assist the customer. A problem arises, however, because the remote assistant cannot see what the customer is seeing or what the customer is doing, particularly in the case of Web sites or applications with remote access. Because of this, the remote assistant often spends a long time talking the customer through how to use a Web site, for example, when the user is experiencing problems, and the remote assistant must troubleshoot problems based upon asking the right questions. It would be difficult or impossible, as well as expensive, for the remote assistant to be physically present at a remote site to manually assist a customer or user with use of the Web site. Accordingly, software has been developed to permit technical support or other personnel to help assist or manage various computer operations, including the use of Web sites and application pages, from a remote location.

One such class of software is known as desktop virtualization software. Desktop virtualization allows separation of the physical location of a personal computer desktop from the physical location of the user who is using that desktop. Desktop virtualization software permits input and output (I/O) from a keyboard, mouse and video display, among other possible elements or components, to be redirected across a network via certain types of desktop virtualization protocols such as Remote Desktop Protocol (RDP), Independent Computing Architecture (ICA) or Virtual Network Computing (VNC). A computer suitably equipped with such software may be controlled and accessed by a user at a remote location as if the computer is local to that user. It is possible, therefore, for technical support or other personnel to assist customers or users from a remote location with such software.

Use of such software is not, however, without significant drawbacks. For example, a customer or Web site user must typically download and install software in order for the remote assistant to monitor or view the user's browser or other interface. This may be inconvenient for the user for a number of reasons. First, the time it takes to download and install the software may be much more time than it will take the remote assistant to solve the user's problem. Second, the software itself may by heavy in terms of space. That is, the software may consume significant space on the computer that might otherwise be used for user files and the like. Oftentimes, such software enables the remote assistant to completely take over the remote machine but at the same time prevents the customer or user from continuing to use the computer. This lack of interactive monitoring can make it difficult for the remote assistant to accurately diagnose the problem the user is experiencing. Also, not only can such software be heavy in terms of space, it typically is heavy in terms of bandwidth. That is, virtualizing the entire desktop by, for example, routing the video and other I/O to the remote location typically consumes significant network bandwidth. All of these limitations are magnified in the situation where a user needs help with something relatively simple like navigating or using a Web site. Thus, heavyweight virtualization of an entire desktop to permit remote viewing of or assistance with, for example, a Web browser or other standalone application is very wasteful of resources and time.

BRIEF DESCRIPTION OF THE DRAWINGS

FIGS. 2*a*-2*e* depict a series of events or states within the example computing environment.

DETAILED DESCRIPTION

Systems and methods in accordance with various embodiments of the present disclosure are provided that permit remote viewing and/or control of a software component such as a browser, application, or other component, in an unobtrusive and resource efficient manner.

Figure 1:
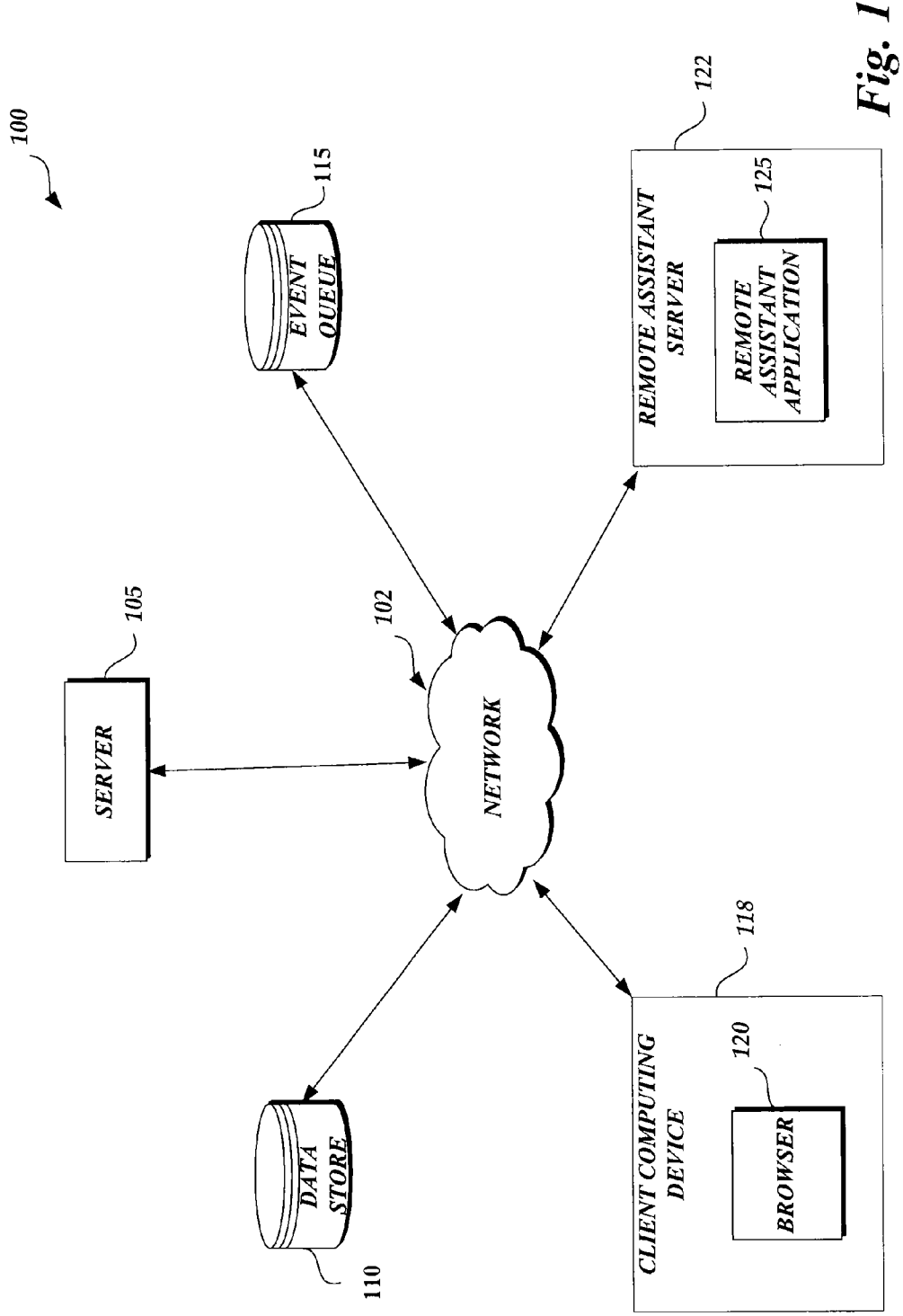
FIG. 1 is a pictorial diagram showing an illustrative computing environment in which embodiments may be implemented.

FIG. 1 illustrates an example computing environment 100 in which various embodiments may be implemented. In one embodiment, the computing environment 100 includes a network 102 that interconnects each network resource. The network 102 may comprise Internet, intranet, and/or other network-connected resources, some or all of which may be suitably configured behind a firewall (not shown) as is known in the art. The network 102 may be a wired and/or wireless network, a cable network, or other type of network. In the illustrated embodiment, the computing environment 100 can also include an application server 105, a data store 110, an event queue 115, a client browser 120 and a remote assistant application 125.

The application server 105 may include any of a number of different conventional server applications running on suitable computing hardware. For example, the application server 105 may be a conventional Web server although that embodiments of the invention may use alternative server implementations and computing hardware including handheld and/or portable computing systems.

The example computing environment 100 also includes a data store 110. As used herein, the term "data store" refers to any device or combination of devices capable of storing, accessing and retrieving data. Such a device or devices may include any combination and number of data servers, databases, data storage devices, file servers, network attached storage (NAS) devices, Web shares and data storage media configured in any standard, distributed or clustered environment. The data store 110 may be configured to allow access via various protocols like, for example, WebDAV. In an embodiment, resources may be stored on the data store 110, retrieved, updated, deleted or otherwise accessed using a Uniform Resource Identifier (URI) as is known in the art. While the data store 110 is depicted in FIG. 1 as being remote from the application server 105, those skilled in the art will appreciate that the data store may be local to the application server 105 in other embodiments.

The example computing environment 100 also includes an event queue 115. The term "event queue" as used herein refers to any combination of software and hardware that is capable of accepting (i.e., queueing) event messages or other data, storing such messages, and likewise serving, dequeueing or otherwise providing such messages in response to a request in a first-in first-out (FIFO) or other appropriate manner. In one embodiment, the event queue 115 is a standalone software application suitably configured to accept event messages provided by a network connected resource and likewise dequeue such event messages via the network 102 in the order received. In another embodiment, the event queue 115 may be natively implemented on the data store 110. For example, the data store 110 may comprise a SQL server and the event queue 115 may be implemented as a stored procedure, a user defined function or using the CREATE QUEUE command of T-SQL. While the event queue 115 is depicted in FIG. 1 as being remote from the application server 105, in other embodiments, the event queue 115 may be local to the application server 105 or to the other components depicted in FIG. 1 and as described below. The event messages may comprise various types of data related to the state of one or more applications as will be discussed more fully below.

The example computing environment 100 also includes a client computing device 118 equipped with a client browser 120 or other appropriate interface component or application. The browser 120 may comprise any browser, application, or process capable of executing client-side code provided via a Web page or other appropriate network resource of parseable information. For example, various embodiments may use browsers capable of executing JavaScript and/or other scripting languages.

The example computing environment 100 also includes a remote assistant server 122 equipped with a remote assistant application 125. In an embodiment, the assistant application 125 includes a standalone application running on suitable computing hardware (e.g. the server 122) and is capable of rendering a page, or otherwise formatting and presenting information to human readers, such as a Web page in a manner like a Web browser or similar application. In an embodiment, the remote assistant application 125 manages and controls the operation of the event queue 115 and data store 110. In other embodiments, however, management and control of these components may be exercised by other components (not shown). Other capabilities of an assistant application 125 according to various embodiments are discussed more fully below.

In the illustrated embodiment, the data store 110 and the event queue 115 together enable remote monitoring of for example, the client browser 120 under circumstances where, for whatever reason, direct communication between an assistant application such as, for example, the remote assistant 125 and the client browser 120 is not possible. For example, suppose the client browser 120 is a Web browser. In such a situation, direct peer-to-peer communication between the client browser 120 and the remote assistant application 125 is not possible because peer-to-peer connections are explicitly prevented in typical Web browser technology. Allowing such connections would create security risks.

A user in an environment such as the computing environment 100 can interact with a Web page or application page, for example, through a browser or similar interface application on a client device. In the case of a Web page, for example, the page can be provided to the client computing device 118 by the server 105 and/or the content can be obtained from at least one Web service. Generally, information is sent from the client computing device 118 back to the server 105 indicating that the page has loaded, etc. Since, as was discussed above, direct browser-to-browser connections generally are not allowed, intermediary communication mechanisms may be relied upon. For example, consider a situation where a user of a Web site calls a customer service representative (CSR) to troubleshoot problems that the user is having on a particular page. The CSR may use the remote assistant application 125 running on the remote assistant server 122 to assist the user in the following general manner.

The server 105 provides a page that the user may view via the browser 120 of the computing device 118 and can include embedded code, such as JavaScript, that can be executed to send information to intermediary components such as, for example, the event queue 115 and data store 110. This information may then be pulled by, or pushed to, the remote assistant application 125 running on the remote assistant server 122. In one embodiment, the embedded code is included in an instance of the page, and the page will include some selectable element such as a button. A user can select the element, which will activate the capturing of information by the embedded code for transmission to the intermediary components. In other embodiments, the CSR might select an option within the remote assistant application 125 that will cause the server 105 to include the embedded code in future pages served to that user. The CSR then instructs the user to refresh their browser, or other application, and although the page may look the same to the user, it will include the embedded code.

In one embodiment, the embedded code causes the browser 120 to send a copy of the page to an intermediary component such as, for example, the data store 110. The remote assistant application 125 running on the remote assistant server 122 may then retrieve the copy of the page from the data store 110 and render a copy on the remote assistant server 122 for viewing by the CSR. Alternatively, where content for the page is provided from a service, the remote assistant application 125 may obtain a copy of the page directly from the service and render it in the same fashion. The rendered copy of the page may then be updated according to events generated by the browser 120 and received by the remote assistant application 125 as is described below.

Since a code element such as a JavaScript module is able to capture user-generated and similar events, and send those events to an intermediary component such as, for example, the event queue 115, the embedded code can be configured to trigger an event each time a user performs an action with respect to the page. For example, if a user selects an item, enters text, or scrolls on the page, events may be generated for any or all of these actions. In some embodiments, each time an event is generated by the embedded code in the page, information for the event can be sent to the event queue 115. In other embodiments, the page can be configured to capture events and then send events to the event queue 115 in batches at a particular interval, such as, for example, every two seconds.

In an embodiment, the remote assistant application 125 is configured to retrieve the events that are stored in the event queue 115. The remote assistant application 125 may be configured to periodically pull the events from the event queue 115 by means of some type of polling mechanism. Alternatively, the events may be actively pushed to the remote assistant application 125 by the event queue 115. The CSR's copy of the page may then be updated by the remote assistant application 125 thereby permitting the CSR to see what the user is doing within the browser 120 and what the user is seeing on his or her screen. The CSR effectively has a duplicate copy of what the user has, without the need for the user to download and install any software, and that duplicate copy rendered on the remote assistant application is updated according to actions that the user is taking within the browser 120.

In some embodiments, the approach can also be bi-directional. This allows the CSR or another appropriate person to effectively manipulate the user's page without actually "taking control" of the user's computer. For example, if a user is having trouble entering information, a CSR can ask the user to let the CSR type for a while, and the CSR can use the remote assistant application 125 to type information into the local rendering of the copy of the users page. Just as with the uni-directional case described above, events may be generated as a result of the CSR interacting with (e.g., typing information into) the local rendering. Those events may likewise be captured and sent to, for example, the event queue 115, or other queue service, and those events can be transmitted to the browser 120 on the client computing device 118 where the embedded code can be further configured to update the user's page accordingly.

A problem still can exist in that the user and the CSR might be looking at different portions of their respective page renderings. An approach in accordance with one embodiment transmits "view" coordinates from the browser 120 to the remote assistant application via the event queue 115, or other suitable communication means, (and possibly vice-versa) so that the CSR can know what the user sees on the user's page rendering within the browser 120. In one embodiment, the CSR's page rendering within the remote assistant application 125 will show exactly the view that the user sees. In another embodiment, a "window" can be formed over the copy of the page being rendered by the remote assistant application 125, such as through shading, which allows the CSR to view and/or navigate the entire page, while still knowing exactly which portion the user sees. In one embodiment, the CSR is able to move this window in order to adjust the user's view. Various other aspects will be described below with respect to other examples.

With reference to FIGS. 2a-2e, an example monitoring method 200 will be described that can be used in the example computing environment 100, with more specific details of a network-based implementation. FIGS. 2a-2e depict a series of events or states within the example computing environment 100. Although the method is described with respect to a Web page in a network-based environment, it should be understood that any appropriate page or other interface element can be rendered remotely or over a network and can take advantage of at least some of the aspects of the present method. The general scenario of a customer service representative (CSR) using embodiments of the invention to assist a user has been outline in detail above. For the sake of brevity, therefore, description of the example monitoring method 200 assumes familiarity with the principles outlined above.

Figure 2A:
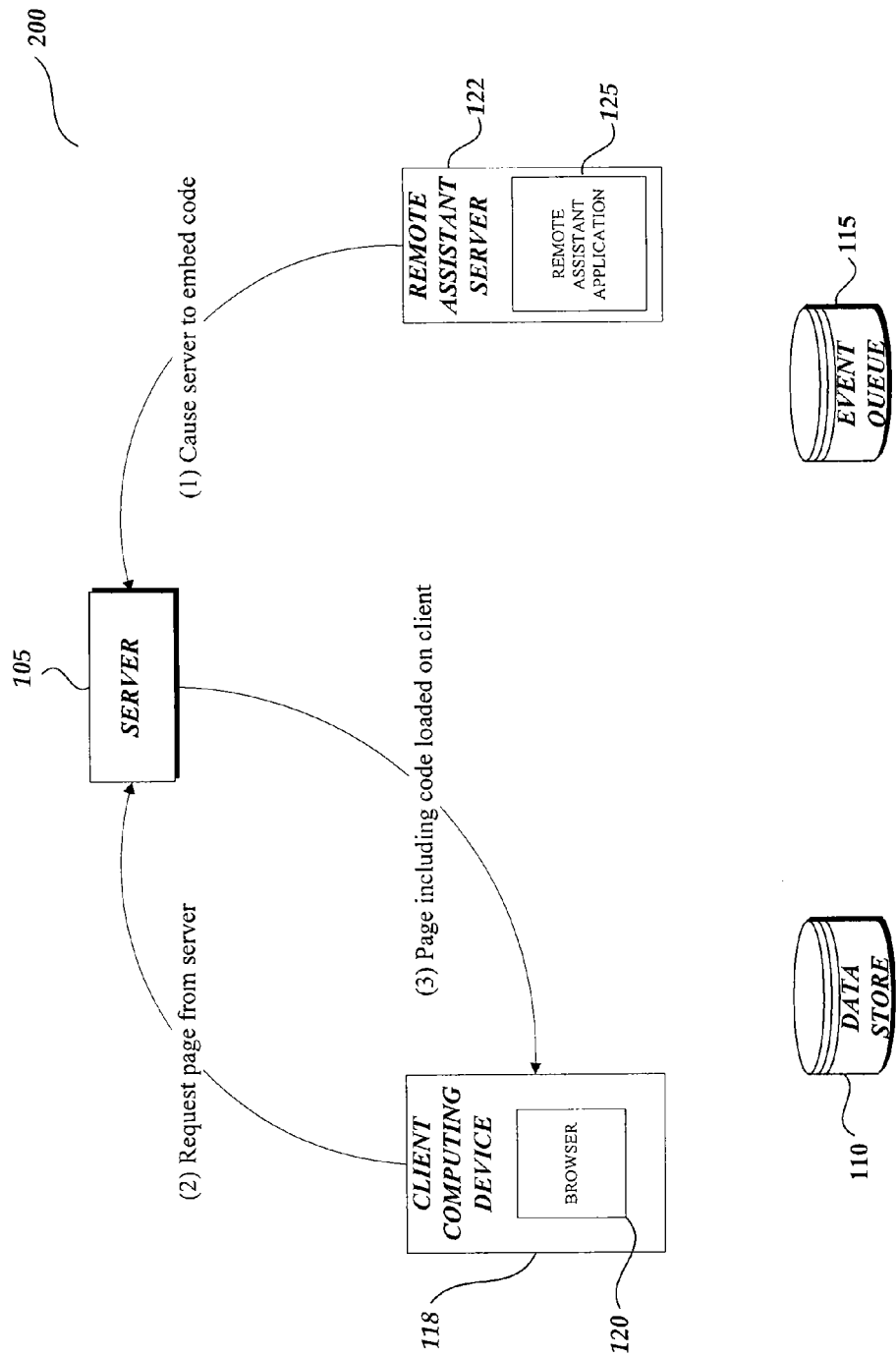

With reference to FIG. 2a, the browser monitoring method 200 begins with the CSR using the remote assistant application 125 to cause the server 105 to embed executable code in Web pages requested by the user of the client computing device 118. In an embodiment, the remote assistant application 125 is used to configure the server 105 to look for an identifying cookie in the cookie cache of the client browser 120. Such a cookie may be used to store suitable identifying information such as, for example, the identity of the user of the client browser 120. If found, the application server 105 is further configured to add the executable code to any Web pages requested by the client browser 120. In other embodiments, other types of identifying information may be provided to the server 105 to enable the server to embed the executable code for pages requested by the user. Once the user requests a page from the server 105, the page including the code is loaded onto the client computing device 118. In an embodiment, the page will typically render on the client computing device 118 just as if the page does not include such code.

Figure 2B:
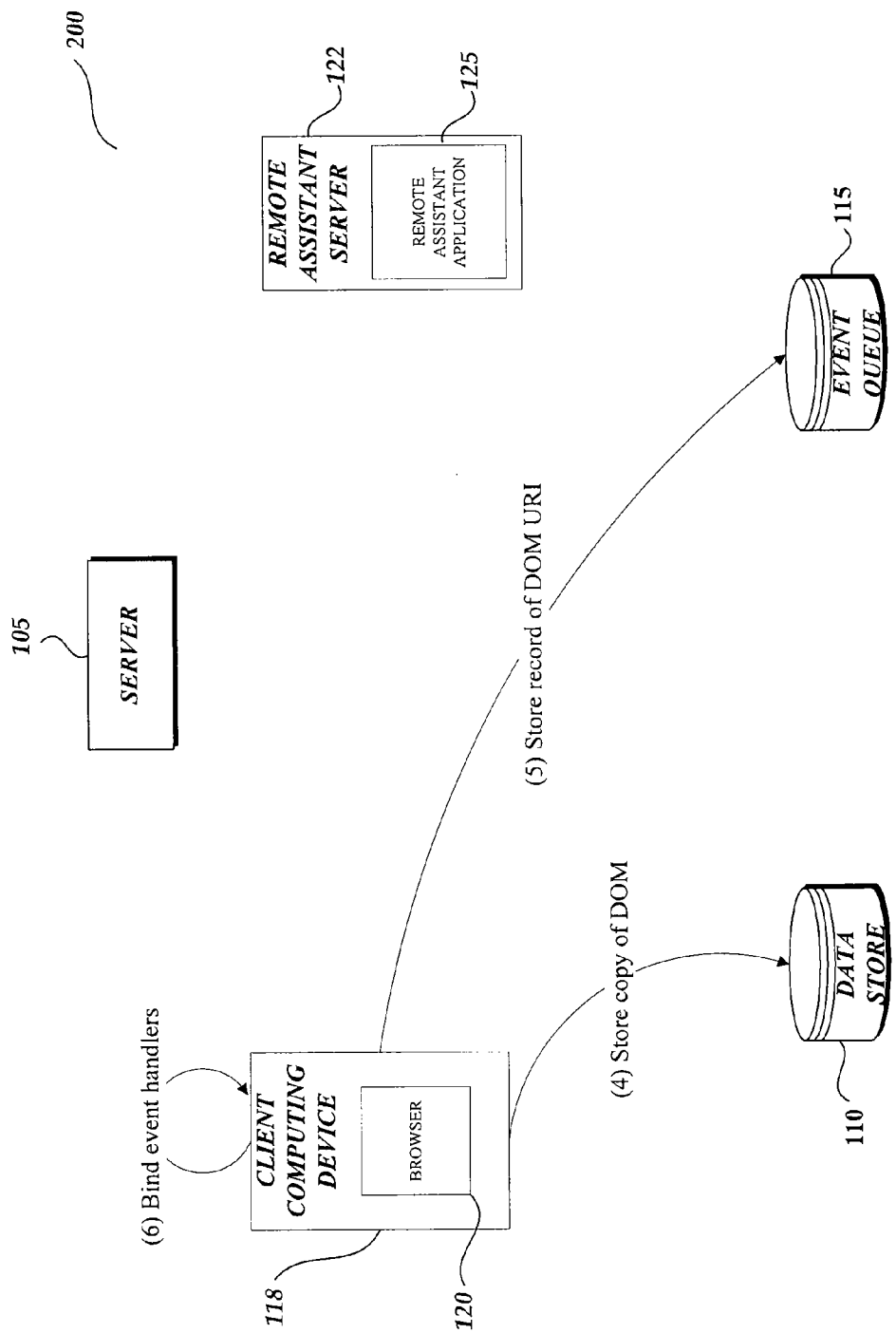

With reference to FIG. 2b, once the client browser 120 on the client computing device 118 has loaded the page, the executable code is enabled to perform a series of actions. The executable code creates a copy of the model or schema with which it is associated, such as a document object model (DOM), and stores that copy on the data store 110. A DOM will be used for ease of explanation, but it should be understood that this is merely one example of an object model or schema. The executable code then stores an event message in the event queue 115 with a link or URI to the copy of the DOM stored on the data store 110. Lastly, the executable code binds event handlers to all user interface modules of the Web page and its associated DOM. The function of these event handlers is discussed in detail below.

With reference to FIG. 2c, once the executable code running in the browser 120 of the client computing device 118 completes these actions, the remote assistant server 125 running on the remote assistant server 122 performs a series of actions. First, the remote assistant application 125 retrieves the event from the event queue 115 that contains the URI of the DOM. Using this URI, the remote assistant application 125 retrieves the copy of the DOM that was previously stored on the data store 110. The remote assistant application 125 generally will locate the appropriate DOM copy on the data store 110 using the identifying information previously discussed. Using the retrieved DOM copy, the remote assistant application 125 can then render the Web page as if the page had been served from a Web server. This can be accomplished from within the remote assistant application 125 itself, or alternatively, a suitably programmed remote assistant application may act as a local server to serve the page to an ordinary Web browser on the local computing hardware.

With reference to FIG. 2d, once the client computing device 118 and remote assistant server 122 each complete their respective series of actions, actual monitoring of the user browser session may commence. The browser 120 and the remote assistant application 125 each enter respective execution loops. The loop running on the browser 120 exists within the executable code that was included with page served by the server 105, and includes a loop that permits the previously bound event handlers to continuously monitor interactions with browser 120 and create event messages based on such interactions. The event handlers then store the event messages in the event queue 115. The execution loop running on the remote assistant application 125 is responsible for retrieving and/or receiving the new event messages stored on the event queue 115. The remote assistant application 125 then uses the retrieved or received event messages to re-render the copy of the DOM that was previously rendered on the remote assistant server 122. This creation of event messages on the browser 120 and updating of the copy of the page on the remote assistant server 122 are performed more or less concurrently. That is, the client browser 120 creates and queues the event messages according to user interactions and at the same time, the remote assistant application 125 retrieves event messages from the event queue 115 and replays the events locally using the previously rendered copy of the DOM. Replaying of events locally means that the user actions within the browser as reflected in the event messages are simulated visually on the rendering of the copy of the page being displayed on the remote assistant server 122. In this fashion, all actions that a remote user takes with the user's browser may be viewed and monitored from a remote location. The event handlers and exemplary event messages are best understood with reference to FIGS. 3-5.

Figure 3:
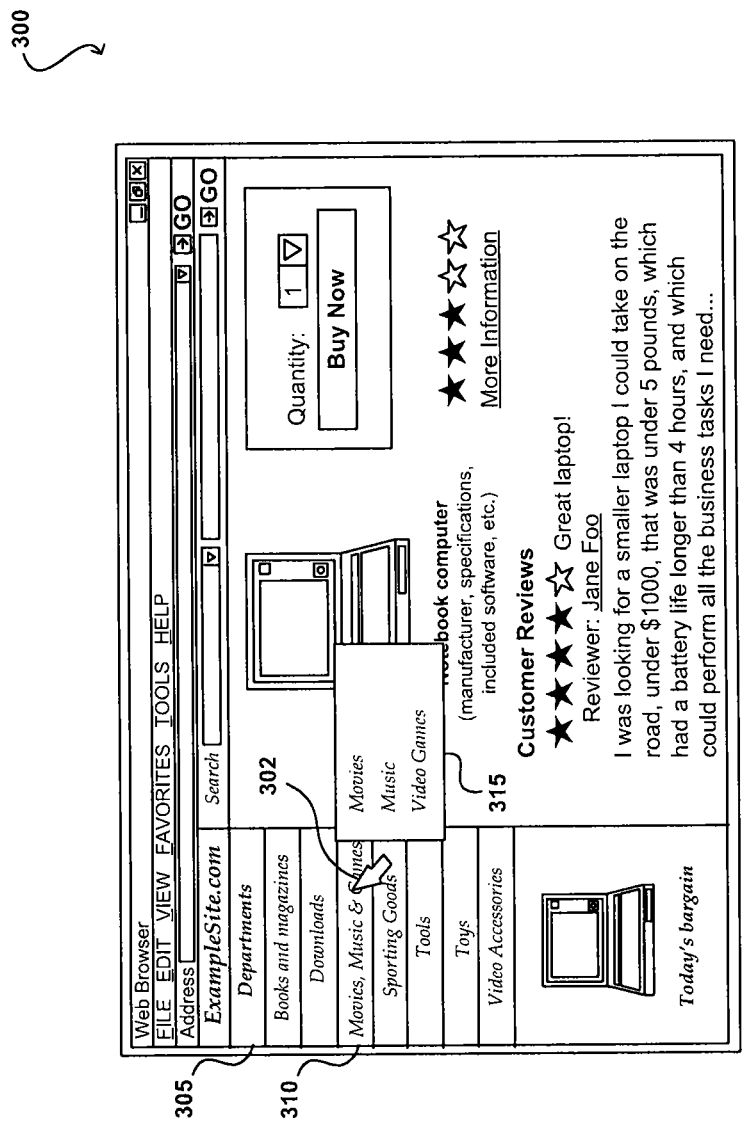
FIG. 3 depicts a browser interface illustrating use of a hover box user interface control in accordance with one embodiment.

FIG. 3 illustrates an example of a page 300 rendering as displayed in the window of the browser 120. The page 300 includes a department menu 305 on the left side of the page. Included within this menu are various departments such as, for example, the Movies, Music & Games menu item 310. The department menu 305 may be configured so that when the pointer 302 is moved across the menu, a hover box may appear. The page 300 depicts such a hover box 315 that appears as a result of the pointer 302 hovering over the Movies, Music & Games menu item. With reference to the browser monitoring method 200, an event handler is bound to the department menu 305 and any such hovering as depicted in FIG. 3 will result in the event handler creating an event message and putting that message in the event queue 115. Such an event message may contain many types of information related to the state of the browser 120. For example, the event message may contain information about the size of the browser window, the location of the browser window, whether the browser window is in focus, the portion of the page visible within the browser window, a screen capture of a pre-selected subset of the browser window, the screen location of a pointer, key presses, button clicks, and use of a rendered control. With respect to the hover box 315, an event message may indicate that the mouse pointer is hovering over the department menu 310 and, therefore, that the hover box 315 is visible within the rendering of the page 300.

In another embodiment, the remote assistant application 125 may be configured to permit the user of the application to retrieve and display a screenshot of some subset of the display area of the browser 120.

In another embodiment, the remote assistant application 125 may be configured to enable the local user interface modules of the local rendering of the copied DOM. The remote assistant application may then bind event handlers to these user interface modules and event messages may be generated for actions undertaken by the CSR using the remote assistant application 125. The executable code included in the Web page served to the client browser 120 may likewise be configured to retrieve such event messages and replay the actions of the user of the remote assistant application 125 within the client Web browser 120. This embodiment permits a fully interactive browser monitoring session whereby the actions undertaken on each of the user interface elements on each rendering is immediately reflected on the other rendering. Although FIGS. 3-5 are discussed in terms of client Web browser 120 actions being replayed on the remote assistant application 125, it will be understood that the behavior in this bi-directional embodiment is substantially the same.

Figure 4:
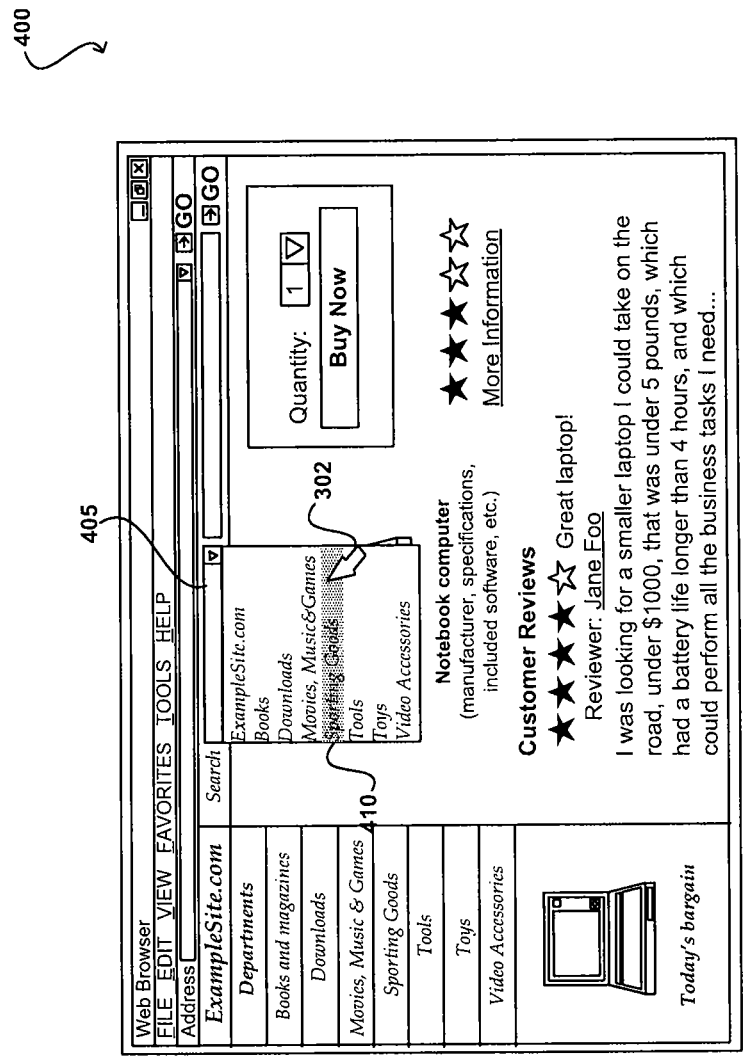
FIG. 4 depicts a browser interface illustrating use of a drop-down box user interface control in accordance with one embodiment.
Figure 5:
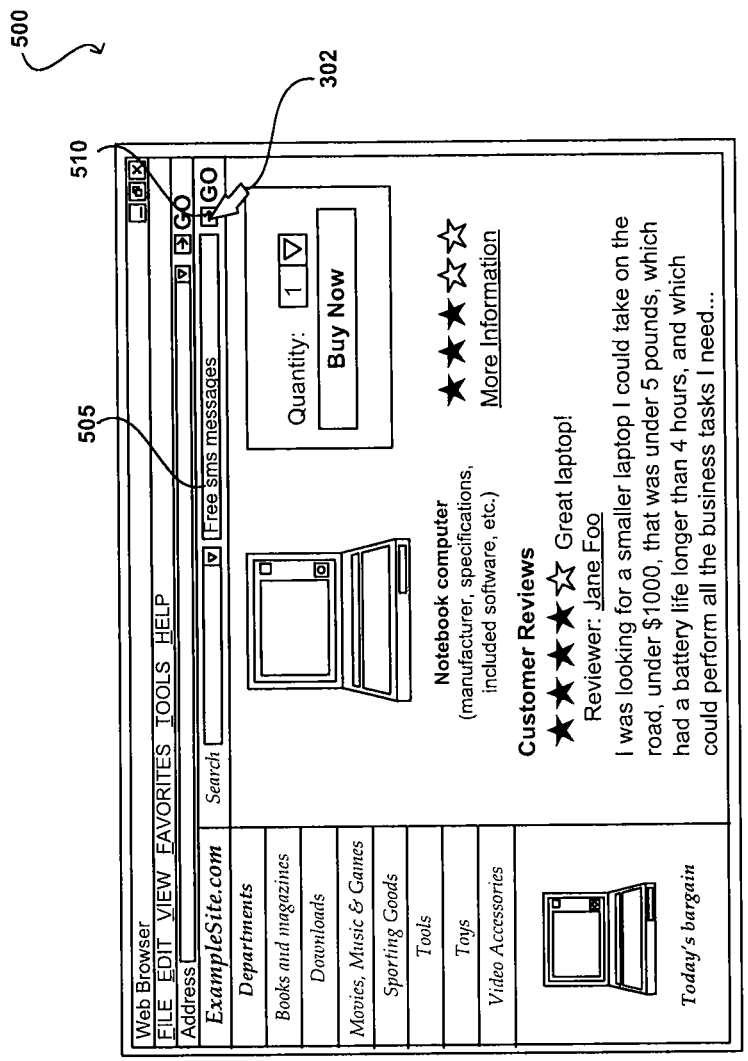
FIG. 5 depicts a browser interface illustrating use of a text box and button user interface controls in accordance with one embodiment.

FIGS. 4 and 5 illustrate other examples of user interface controls. The example Web page 400 includes a drop-down box 405. After clicking on the drop-down box 405, a drop-down menu appears. The pointer 302 is shown hovering above the Sporting Goods menu item 410. Here, the event handler associated with this drop-down box 405 would queue an event message in the event queue 115 when the drop-down box 405 is initially clicked. The remote assistant application 125 then retrieves this event message from the event queue 125 and displays the drop-down menu on the local rendering of the Web page as if the user of the remote assistant application 125 had clicked on the drop-down box themselves.

FIG. 5 depicts the use of a text box user interface control. The text box control 505 is illustrated with the phrase "free sms messages" in the control. The event handler bound to this control may queue one or more event messages to the event queue 115 that reflect the key presses necessary to type the phrase into the text box control 505. FIG. 5 also depicts a button control 510 shown with the pointer 302 hovering above. When clicked, the event handler for this user interface control will likewise queue an event message in the event queue 115 indicating that the button had been pressed. The event message may also contain information such as the location of the pointer or other information as may be required.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, or other non-transitory computer-readable media.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of monitoring a remote interface, the method comprising:
    under control of one or more computer systems configured with executable instructions,
    in response to a request from a client application of a client device that is not in direct communication with a remote monitoring device, causing a page to be transmitted for display on a screen of the client device, the page including executable code configured to:
        with at least a portion of the executable code executed on the client device,
        store an object model for the page in a storage service;
        send a link pointing to the object model to a queue service;
        create at least one event message associated with the client application in response to an interaction with the page on the client device, the interaction including access of at least one page element and resulting in a modified appearance of the page when displayed on the screen of the client device; and
        send the created at least one event message associated with the client application to the queue service, the event message including a screen location of a pointer that accesses the at least one page element and a screen location of the at least one page element;
    causing the remote monitoring device to render a copy of the page to be displayed on a screen of the remote monitoring device by retrieving the object model for the page from the storage service using the link stored to the queue service;
    causing display of the rendered copy of the page to be displayed on the screen of the remote monitoring device; and
    in response to detecting the at least one event message in the queue service, causing the remote monitoring device to update the copy of the page to be displayed based on the detected event message by visually simulating the interaction with the page on the client device so that the rendered copy of the page displayed on the screen of the remote monitoring device reproduces the modified appearance of the page as a result of the interaction with the page by displaying the modified appearance of the page to be rendered on the screen of the remote monitoring device.

2. A computer-implemented method according to claim 1, wherein:
    the object model is a Document Object Model (DOM).

3. A computer-implemented method of monitoring a remote interface on a monitoring device, the method comprising:
    under control of one or more computer systems configured with executable instructions,
    in response to a request from a client application of a remote computing device that is not in direct communication with the monitoring device, causing a page to be transmitted for display on a screen of the remote computing device, at least a portion of the page to be displayed on a screen of the remote computing device, the page including executable code configured to create page data associated with the client application and to create an event message associated with the client application created in response to an interaction with the page on the remote computing device, the interaction with the page resulting in a modified appearance of the page when displayed on the screen of the remote computing device;
    generating a copy of the page to be displayed on a screen of the monitoring device using the page data created by the executable code;
    receiving the event message associated with the client application created on the remote computing device in response to the interaction with the page rendered on the remote computing device, the interaction including interaction with at least one page element with a pointer, the event message including at least a screen location of the pointer that interacts with the page;
    causing display of the generated copy of the page to be displayed on the screen of the monitoring device; and
    updating the copy of the page to be displayed on the screen of the monitoring device in accordance with the received event message associated with the client application by visually simulating the interaction with the page on the remote computing device so that the copy of the page displayed on the screen of the monitoring device reproduces the modified appearance of the page as a result of the interaction with the page by displaying the modified appearance of the page on the screen of the monitoring device.

4. A computer-implemented method according to claim 3, wherein:
the page is one of an application page and a Web page.

5. A computer-implemented method according to claim 3, wherein:
the executable code is embedded in the page and configured to capture interactions with the page and generate event messages in response thereto.

6. A computer-implemented method according to claim 5, further comprising:
enabling a selection of a selectable element of the page to activate the embedded executable code.

7. A computer-implemented method according to claim 5, further comprising:
enabling a page to be refreshed in order to activate the embedded executable code, wherein the embedded executable code is activated by the monitoring device.

8. A computer-implemented method according to claim 3, wherein:
the page is obtained from a Web service.

9. A computer-implemented method according to claim 3, wherein:
the monitoring device is configured to be used by a service representative to assist the remote computing device.

10. A computer-implemented method according to claim 3, further comprising:
receiving coordinate information for the page on the remote computing device; and
causing the copy of the page on the monitoring device to be rendered such that the monitoring device is able to determine the active view of the page on the remote computing device.

11. A computer-implemented method according to claim 3, further comprising:
causing to be captured interaction with the copy of the page on the monitoring device;
causing to be generated event information from the monitoring device in response to an interaction with the copy of the page on the monitoring device; and
causing to be transmitted the event information to the remote computing device, wherein the page displayed on the screen of the remote computing device is able to be updated to reflect the interaction on the monitoring device.

12. A computer-implemented method according to claim 3, wherein the executable code is included in the page based on identifying information associated with the remote computing device.

13. A computer-implemented method according to claim 3, wherein the interaction with the page on the remote computing device includes interaction with at least one of a button, a hover box, a mouseover, a checkbox, a radio button, a menu, a scroll bar, a text input, and a file select.

14. A computer-implemented method according to claim 3, wherein event messages are received from the remote computing device in batches.

15. A system for monitoring a remote interface, comprising:
a processor; and
a memory device storing instructions executable on the processor, the instructions comprising:
a page generation component that, when executed in response to a request from a client application of a client device that is not in direct communication with a remote monitoring device, causes the processor to initiate transmission of a page to the client device, at least a portion of the page to be displayed on a screen of the client device, the page including an embedded executable code component, the executable code component being configured to cause the client device to, when executed on the client device:
store an object model for the page in a storage service;
create at least one event message associated with the client application in response to an interaction with the page on the client device, the interaction including access of at least one page element and resulting in a modified appearance of the page when displayed on the screen of the client device; and
send the created at least one event message associated with the client application to a queue service, the at least one event message including a screen location of a pointer that accesses the at least one page element and a screen location of the at least one page element; and
a monitoring component that, when executed, causes the processor to:
render a copy of the page on a screen of the remote monitoring device, the copy of the page being based on the stored object model for the page;
initiate display of the rendered copy of the page to be displayed on the screen of the remote monitoring device;
detect the at least one event message in the queue service; and
update the copy of the page by visually simulating the interaction with the page on the client device so that the copy of the page displayed on the screen of the remote monitoring device reproduces the modified appearance of the page as a result of the interaction with the page by displaying the modified appearance of the page on the screen of the remote monitoring device.

16. A system according to claim 15, wherein the executable code component is further configured to enable performance an action to activate instructions included in the executable code component for capturing the interaction with the page on the client device.

17. A system according to claim 15, wherein the monitoring device component is further configured to:
receive coordinate information for the page on the client device; and
render the copy of the page on the monitoring device such that the monitoring device is able to determine an active view of the page on the client device.

18. A system according to claim 15, wherein the monitoring device component is further configured to:
capture interaction with the copy of the page on the remote monitoring device;
generate an event message in response to an interaction with the copy of the page on the remote monitoring device; and
transmit the event message to the client device, wherein the page displayed on the screen of the client device is configured to be updated to reflect the interaction on the remote monitoring device.

19. A system according to claim 15, wherein the monitoring device component is further configured to receive event messages from the client device in batches.

20. A computer program product for monitoring a remote interface collectively stored in one or more non-transitory computer readable media, comprising:
program code for transmitting, at least in response to a request from a client application of a client device that is not in direct communication with a remote monitoring device, a page including executable code to the client device, at least a portion of the page to be displayed on a screen of the client device, the executable code, when executed, causing a processor to store an object model for the page, create at least one event message associated with the client application in response to an interaction with the page rendered on the client device, the interaction including access of at least one page element and resulting in a modified appearance of the page when displayed on the screen of the client device, the event message associated with the client application including a screen location of a pointer that accesses the at least one page element and a screen location of the at least one page element, and send the created at least one event message associated with the client application to a queue service; and
program code for rendering a copy of the page to be displayed on a screen of the remote monitoring device, the copy of the page being based at least in part on the stored object model for the page, causing display of the rendered copy of the page to be displayed on the screen of the remote monitoring device, detecting the at least one event message in the queue service, and updating the copy of the page to be displayed by visually simulating the interaction with the page on the client device so that the copy of the page displayed on the screen of the remote monitoring device reproduces the modified appearance of the page as a result of the interaction with the page by displaying the modified appearance of the page to be rendered on the screen of the remote monitoring device.

21. A computer program product according to claim 20, further comprising:
program code for enabling performance of an action to activate executable instructions for capturing an event.

22. A computer program product according to claim 20, further comprising:
program code for receiving coordinate information for the page on the client device; and
program code for rendering the copy of the page on the monitoring device such that the monitoring device is able to determine an active view of the page on the client device.

23. A computer program product according to claim 20, further comprising:
program code for capturing interaction with the copy of the page on the remote monitoring device;
program code for generating an event message in response to an interaction with the copy of the page on the remote monitoring device; and
program code for transmitting the event message to the client device, wherein the page displayed on the screen of the client device is configured to be updated to reflect the interaction on the remote monitoring device.

24. A computer program product according to claim 20, further comprising:
program code for receiving event messages from the client device in batches.

* * * * *